US011353069B2

(12) United States Patent
Barrientos Blanco et al.

(10) Patent No.: US 11,353,069 B2
(45) Date of Patent: Jun. 7, 2022

(54) TRANSMISSION FOR A VEHICLE

(71) Applicant: Ningbo Geely Automobile Research & Development Co., Ltd., Ningbo (CN)

(72) Inventors: Eva Barrientos Blanco, Gothenburg (SE); Henrique Budacs, Gothenburg (SE)

(73) Assignee: NINGBO GEELY AUTOMOBILE RESEARCH & DEVELOPMENT CO., Ningbo (CN)

(*) Notice: Subject to any disclaimer, the term of this patent is extended or adjusted under 35 U.S.C. 154(b) by 30 days.

(21) Appl. No.: 16/936,949

(22) Filed: Jul. 23, 2020

(65) Prior Publication Data
US 2020/0355228 A1 Nov. 12, 2020

Related U.S. Application Data

(63) Continuation of application No. PCT/CN2018/122458, filed on Dec. 20, 2018.

(30) Foreign Application Priority Data

Feb. 5, 2018 (EP) .................................... 18155047

(51) Int. Cl.
*F16D 48/06* (2006.01)
*F16D 23/02* (2006.01)

(52) U.S. Cl.
CPC ............ *F16D 48/06* (2013.01); *F16D 23/02* (2013.01); *F16D 2300/18* (2013.01);
(Continued)

(58) Field of Classification Search
CPC ...... F16D 48/06; F16D 23/02; F16D 2300/18; F16D 2500/10406; F16D 2500/10462;
(Continued)

(56) References Cited

U.S. PATENT DOCUMENTS 3,915,271 A * 10/1975 Harper ................... B63H 23/30
477/5
5,465,819 A 11/1995 Weilant
(Continued)

FOREIGN PATENT DOCUMENTS

CN 102644711 A 8/2012
CN 105402395 A 3/2016
(Continued)

OTHER PUBLICATIONS

International Search Report (ISR) from corresponding PCT/CN2018/122458, dated Mar. 19, 2019, 2 pages.
(Continued)

*Primary Examiner* — Edwin A Young
(74) *Attorney, Agent, or Firm* — Tucker Ellis, LLP

(57) ABSTRACT

A transmission for a vehicle includes a first rotating member for rotation about an axis and a second rotating member for rotation about the axis. The first rotating member and the second rotating member are connectable to each other such that the first rotating member and the second rotating member are rotationally locked relative to each other for transferring torque between the first rotating member and the second rotating member. The transmission comprises a sensor arrangement for measuring a relative angular position of the first rotating member and the second rotating member while at least one of the first rotating member and the second rotating member is rotating.

17 Claims, 3 Drawing Sheets

(52) U.S. Cl.
CPC .............. *F16D 2500/10406* (2013.01); *F16D 2500/10462* (2013.01); *F16D 2500/30408* (2013.01)

(58) Field of Classification Search
CPC . F16D 2500/30408; F16D 2500/70402; F16D 2500/70412; F16H 2059/462; F16H 2061/0474
See application file for complete search history.

(56) References Cited

U.S. PATENT DOCUMENTS

| | | | |
|---|---|---|---|
| 5,827,148 A | 10/1998 | Seto et al. | |
| 5,928,110 A * | 7/1999 | Vornehm | B60W 10/10 477/166 |
| 6,165,103 A | 12/2000 | Tenzor | |
| 9,605,755 B2 * | 3/2017 | Hoefflin | F16H 63/30 |
| 2011/0149300 A1 | 6/2011 | Takeda | |
| 2011/0304292 A1 * | 12/2011 | Charuel | F16D 23/02 318/450 |
| 2012/0211323 A1 | 8/2012 | Goeppert | |
| 2014/0209426 A1 | 7/2014 | Mori | |
| 2016/0068163 A1 * | 3/2016 | Fujii | B60W 10/06 701/54 |
| 2016/0146341 A1 | 5/2016 | Hoefflin et al. | |
| 2016/0169928 A1 | 6/2016 | Fleischmann | |
| 2017/0074380 A1 * | 3/2017 | Raghavan | F16D 27/118 |

FOREIGN PATENT DOCUMENTS

| | | |
|---|---|---|
| DE | 19953937 A1 | 5/2001 |
| DE | 102015216509 A1 | 3/2017 |
| WO | 2011028209 A1 | 3/2011 |
| WO | 2016198510 A1 | 12/2016 |

OTHER PUBLICATIONS

Extended European Search Report (EESR) from corresponding European Application No. 18155047, dated Aug. 30, 2018, 2 pages.
International Preliminary Report on Patentability (IPRP) from corresponding PCT/CN2018/122458, dated May 21, 2020 (inadvertently stated as May 21, 2021 in the document), 16 pages.

* cited by examiner

TRANSMISSION FOR A VEHICLE

RELATED APPLICATION DATA

This application is a continuation of International Patent Application No. PCT/CN2018/122458, filed Dec. 20, 2018, which claims the benefit of European Patent Application No. 18155047.6, filed Feb. 5, 2018, the disclosures of which are incorporated herein by reference in their entireties.

TECHNICAL FIELD

The invention relates to a transmission for a vehicle and a method for shifting gears in a transmission.

BACKGROUND

Vehicle transmissions usually have synchronizers for shifting gears. For example, an idle gear wheel that is journaled on an output shaft and engaged with a gear wheel arranged on an input shaft, can be connected to the output shaft by a synchronizer. The synchronizer has a sleeve that is brought into engagement with for example a dog ring of the idle gear wheel. The sleeve is connected to a hub by means of a spline joint. The hub is in turn rotationally locked relative to the output shaft. Thus, when the sleeve and the dog ring are engaged, the idle gear wheel and the output shaft are rotationally locked relative to each other by means of the synchronizer and torque can be transferred from the input shaft to the output shaft via the gear wheels.

When shifting gears, before displacement of the sleeve for engaging the dog ring, the rotation speeds of the idle gear wheel and the sleeve are synchronized. For this purpose, the synchronizer can comprise friction rings. Such a synchronizer often involves many components and high complexity. Further, there is still a risk of noisy gear shifting due to tooth tip-to-tooth tip contact between the sleeve and the dog ring.

For a non-synchronous transmission, the matching of the teeth at gear shifting will require dog rings with relatively few teeth with large gap between the teeth for enabling the gear shifting. Usually such a transmission is associated with noisy gear shifting and poor driver comfort.

SUMMARY

An objective of the invention is to provide a transmission enabling an improved gear shifting in a synchronized transmission or a non-synchronous transmission.

The objective is achieved by a transmission for a vehicle, wherein the transmission comprises a first rotating member for rotation about an axis and a second rotating member for rotation about the axis, and the first rotating member and the second rotating member are connectable to each other such that the first rotating member and the second rotating member are rotationally locked relative to each other for transferring torque between the first rotating member and the second rotating member, wherein the transmission comprises a sensor arrangement for measuring a relative angular position of the first rotating member and the second rotating member while at least one of the first rotating member and the second rotating member is rotating.

The invention is based on the insight that by such a transmission the engagement of the first rotating member and the second rotating member can be matched in a way providing a smooth gear shifting. For example, when using splines for connecting the first rotating member and the second rotating member to each other, the risk of undesired contact between teeth of the first rotating member and teeth of the second rotating member can be reduced or eliminated. By knowledge of the relative angular position between the first rotating member and the second rotating member before engagement of the first rotating member and the second rotating member, the control of a shifting mechanism can be optimized for improving the shifting process.

For example, the transmission may comprise a shaft and a hub rotationally locked relative to the shaft, wherein the first rotating member is an axially displaceable sleeve arranged on the hub and the second rotating member is an idle gear wheel which is journaled on the shaft. The idle gear wheel can have a dog ring for engagement with the sleeve.

According to one embodiment, the first rotating member has a set of teeth and the second rotating member has a set of teeth, and the first rotating member teeth and the second rotating member teeth are arranged for engagement with each other for connection of the first rotating member and the second rotating member to each other, wherein the sensor arrangement is arranged for measuring the relative angular position between the first rotating member teeth and the second rotating member teeth. Hereby, the relative position of the first rotating member and the second rotating member can be determined by a relatively non-complicated measuring equipment.

For example, the sensor arrangement can be arranged for sensing a tooth at a predetermined measuring position or for sensing a gap between two adjacent teeth at a predetermined measuring position. Various type of sensors, such as optical, magnetic, and ultrasonic sensors, can be used. As an example, the sensor can be used for creating a pulse signal, such as a square wave signal, where "1" represents a tooth and "0" represents no tooth.

According to another embodiment, the sensor arrangement comprises a first sensor unit for measuring an angular position of the first rotating member and a second sensor unit for measuring an angular position of the second rotating member, and preferably the first sensor unit is arranged for measuring the angular position of the first rotating member at a first predetermined measuring position and the second sensor unit is arranged for measuring the angular position of the second rotating member at a second predetermined measuring position, wherein the first predetermined measuring position and the second predetermined measuring position are arranged at the same angular position or with a predetermined angular distance relative to each other with respect to the rotation axis. Hereby, the relative angular position between the first rotating member and the second rotating member can be calculated from the measured values received from the first sensor unit and the second sensor unit.

According to a further embodiment, the transmission has a shifting mechanism for displacement of the first rotating member and the second rotating member relative to each other, wherein at least a part of the sensor arrangement is arranged on the shifting mechanism. Hereby, the sensor can be arranged at a relevant measuring position at the same time as an existing component of the transmission can be used for supporting the sensor.

According to another aspect of the invention, a further objective is to provide a method for shifting gears in a transmission by which method the gear shifting process can be improved.

This objective is achieved by a method for shifting gears in a transmission comprising a first rotating member for rotation about an axis and a second rotating member for rotation about the axis, and a shifting mechanism, wherein the first rotating member and the second rotating member are connectable to each other such that the first rotating member and the second rotating member are rotationally locked relative to each other for transferring torque between the first rotating member and the second rotating member, which method comprising the steps of measuring a relative angular position of the first rotating member and the second rotating member while at least one of the first rotating member and the second rotating member is rotating, and controlling the shifting mechanism based on the measured relative angular position for connecting the first rotating member and the second rotating member to each other while at least one of the first rotating member and the second rotating member is rotating.

According to one embodiment, the method comprises the step of controlling the shifting mechanism based on a relative rotational speed of the first rotating member and the second rotating member. By using both the relative angular position and the relative rotational speed of the first rotating member and the second rotating member as input data, the gear shifting can be further improved. The rotational speed can be measured by the sensor arrangement used for measuring the angular position or the rotational speed can be measured by any other sensor and/or the rotational speed can be known from other measurements or calculations.

According to another embodiment, the method comprises the step of controlling the shifting mechanism based on a relative axial position of the first rotating member and the second rotating member. By using the relative axial position of the first rotating member and the second rotating member as input data, the gear shifting can be further improved. The axial position can be measured by a sensor and/or be given from the dimensions of the transmission.

According to a further embodiment, the method comprises the step of controlling the starting point, speed and/or acceleration of the shifting mechanism based on the measured relative angular position of the first rotating member and the second rotating member. Having knowledge of the relative angular position between the first rotating member and the second rotating member, the movement parameters of the shifting mechanism can be selected for matching the engagement between the first rotating member and the second rotating member.

In addition, the invention relates to a control unit for controlling a transmission, wherein the control unit is configured to receive input data indicating a relative angular position of a first rotating member and a second rotating member while at least one of the first rotating member and the second rotating member is rotating, and to provide output data based on the received input data for controlling a shifting mechanism for connecting the first rotating member and the second rotating member to each other while at least one of the first rotating member and the second rotating member is rotating.

The advantages of the control unit are substantially the same as the advantages already discussed hereinabove with reference to the different embodiments of the transmission and the method.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1:
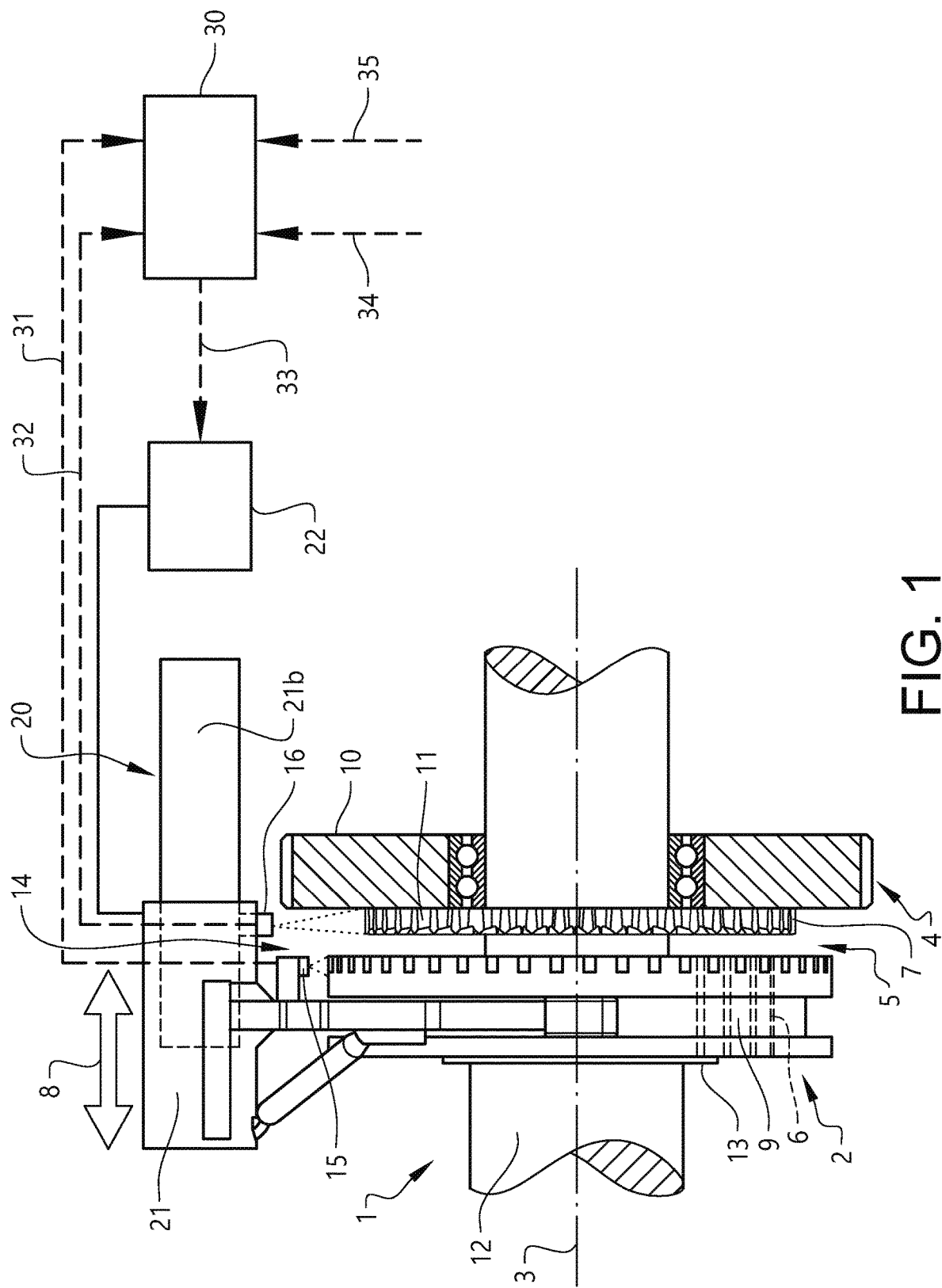
FIG. 1 is a side view of a transmission.

FIG. 1 is a side view of a transmission 1. As will be evident from the description herein, the invention can be applied to various transmissions for improving gear shifting. Particularly, the invention can be applied both for transmissions comprising a synchronizer, for example with friction rings for synchronizing the speeds of a first rotating member and a second rotating member, and transmissions without synchronizer (non-synchronous transmission). Although only a few components are illustrated in FIG. 1, the transmission may of course comprise further components such as gear wheels, shafts, bearings, couplings, etc.

The transmission 1 illustrated in FIG. 1 comprises a first rotating member 2 for rotation about an axis 3 and a second rotating member 4 for rotation about the axis 3. The first rotating member 2 and the second rotating member 4 are connectable to each other such that the first rotating member and the second rotating member are rotationally locked relative to each other for transferring torque between the first rotating member 2 and the second rotating member 4. The first rotating member 2 and the second rotating member 4 are suitably components for enabling activation of a specific gear of the transmission 1. In FIG. 1, the first rotating member 2 and the second rotating member 4 are disengaged representing a state where the current gear is not activated.

The connection between the first rotating member 2 and the second rotating member 4 can be achieved by any suitable engagement means 5 used in transmissions. For example, the first rotating member 2 can have a set of teeth 6 and the second rotating member 4 can have a set of teeth 7 arranged for engagement with each other for connection of the first rotating member 2 and the second rotating member 4 to each other. In the perspective view of FIG. 2A, illustrating the first rotating member 2 and the second rotating member 4, such an engagement means 5 in form of teeth 6 arranged on the inside of the first rotating member 2 and teeth 7 arranged on the outside of the second rotating member 4 can be seen.

Further, the first rotating member 2 and the second rotating member 4 are suitably displaceable relative to each other in a direction 8 in parallel with the rotation axis 3 for engagement and disengagement of the first rotating member 2 and the second rotating member 4. As previously mentioned, the first rotating member 2 and the second rotating member 4 are suitably components for enabling activation of a specific gear of the transmission 1. When the first rotating member 2 and the second rotating member 4 are positioned such that the first rotating member teeth 6 and the second rotating member teeth 7 are engaged, the current gear is activated.

Figure 2B:
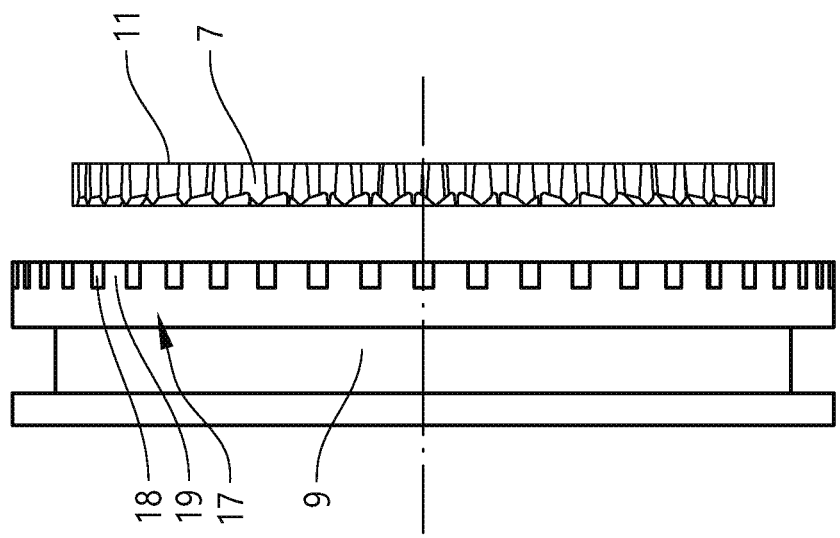
FIG. 2B is a side view of the sleeve and dog ring in FIG. 2A.
Figure 2A:
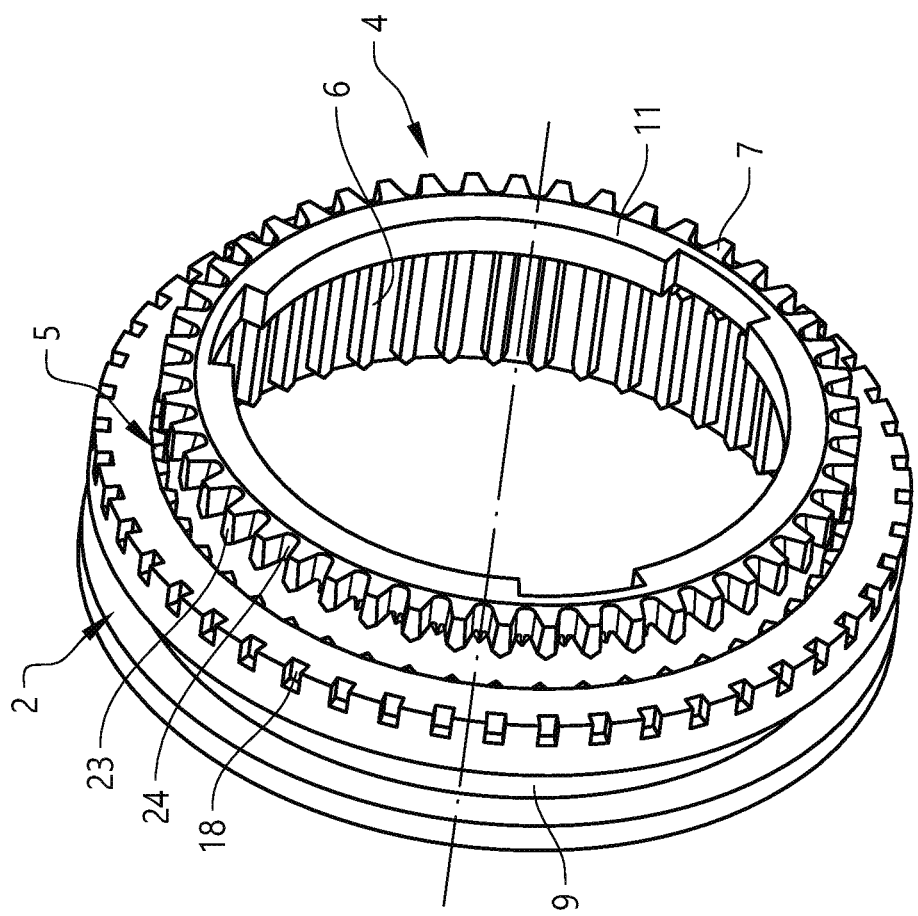
FIG. 2A is a perspective view of a sleeve and a dog ring of the transmission in FIG. 1.

In the example embodiment illustrated in FIGS. 1, 2A and 2B, the engagement means 5 is a spline joint. The first rotating member 2 exemplified by a sleeve 9 is provided with internal teeth 6 of the spline joint and the second rotating member 4 exemplified by a gear wheel having a dog ring 11 is provided with external teeth 7 of the spline joint.

Further, the transmission may comprise a shaft 12 and a hub 13 rotationally locked relative to the shaft 12, where the first rotating member is an axially displaceable sleeve 9 arranged on the hub 13 and the second rotating member is an idle gear wheel 10 which is journaled on the shaft 12. By axially displacement of the sleeve 9 along the rotation axis 2 and thereby engagement of the sleeve 9 and the dog ring 11, the idle gear wheel 10 is rotationally locked to the shaft 12. For example, a further gear wheel (not shown) arranged on another shaft can be engaged with the idle gear wheel 10. The current gear provided by the further gear wheel and the idle gear wheel 10 is thus activated by engagement of the sleeve 9 and the dog ring 11 of the idle gear wheel 10.

The rotational speed of the sleeve 9 and the rotational speed of the idle gear wheel 10 can be synchronized before engagement of the sleeve 9 and the idle gear wheel 10.

The transmission comprises a sensor arrangement 14 for measuring a relative angular position of the first rotating member 2 and the second rotating member 4 while at least one of the first rotating member and the second rotating member is rotating. This measurement is performed before activation of the gear, optionally after synchronization by means of a synchronizer (not shown), when the first rotating member 2 and the second rotating member 4 are disengaged.

For example, the sensor arrangement 14 can be arranged for measuring the relative angular position between the first rotating member teeth 6 and the second rotating member teeth 7. Since the distance between two teeth is known from the dimensions of the rotating member 2, 4, the positions of all teeth are known as soon as the position of one tooth is known. Correspondingly, if the position of a gap between two teeth is known, the positions of all gaps of the rotating member 2, 4 are known.

The sensor arrangement 14 preferably comprises a first sensor unit 15 for measuring an angular position of the first rotating member 2 and a second sensor unit 16 for measuring an angular position of the second rotating member 4. The values measured by the first and second sensor units 15, 16 can then be used for calculation of the relative angular position of the first rotating member 2 and the second rotating member 4. The first sensor unit 15 is suitably arranged for measuring the angular position of the first rotating member 2 at a first predetermined measuring position and the second sensor unit 16 is suitably arranged for measuring the angular position of the second rotating member 4 at a second predetermined measuring position. By predetermined measuring position is meant the position of the sensor unit relative to the current rotating member. Thus, the radial distance and the axial distance (if any) between the sensor unit and the rotating member to be sensed are preferably kept constant. Further, the angular position of the sensor unit relative to the rotation axis 3 is also preferably kept constant. The first predetermined measuring position and the second predetermined measuring position can be arranged at the same angular position or they can be arranged with a predetermined angular distance relative to each other with respect to the rotation axis 3.

For determining the relative angular position between the first rotating member 2 and the second rotating member 4, the sensor arrangement 14 can be arranged for sensing a tooth at a predetermined measuring position or sensing a gap between two adjacent teeth at a predetermined measuring position. For example, a tooth can be sensed by sensing the tooth tip surface 23 and a gap can be sensed by sensing the bottom surface 24 between two teeth. See FIG. 2A.

FIG. 2B shows the sleeve 9 and the dog ring 11 of the idle gear wheel 10 in a side view. Since the sleeve 9 has the teeth 6 arranged on the inside, the teeth 6 are not visible from the outside of the sleeve 9. If an optical sensor is used which sensor would require visible teeth, the sleeve can be designed with marks 17 readable by the sensor. These marks are arranged on the outer surface of the sleeve 9 and the positions of the marks 17 correspond to the real positions of the teeth 6 and/or gaps between teeth which are arranged on the inner surface of the sleeve 9. In this way, the sensor can be arranged to determine the current angular position of the sleeve 9 by sensing the marks 17 on the outer surface of the sleeve instead of direct measurement of the teeth and/or gaps. Such marks 17 are schematically indicated by recesses 18 representing teeth and surfaces 19 between the recesses representing gaps. A lot of various marks on the surface indicating teeth and/or gaps can be used. Another solution is to use alternating black and white fields representing teeth and gaps. As it regards the dog ring 11, no such marks are necessary since the dog ring has external teeth 7.

In the embodiment illustrated in FIG. 1, the transmission 1 has a shifting mechanism 20 for axial displacement of the first rotating member 2 and the second rotating member 4 relative to each other. The shifting mechanism 20 may comprise a fork 21 coupled to the sleeve 9 in a way allowing the sleeve to rotate. The shifting mechanism 20 preferably has a drive unit 22 (schematically shown) for the movement of the fork 21 in the axial direction 8 relative to a fork holder 21b, also called fork road. The drive unit 22 may include an electric motor, hydraulics, or any suitable device for enabling the fork 21 and thereby the sleeve 9 to be displaced to the gear position where the sleeve 9 and the dog ring 11 are engaged and to a neutral position where the sleeve 9 and the dog ring 11 are disengaged, respectively.

At least a part of the sensor arrangement 14 can be arranged on the shifting mechanism 20. Here, the first sensor unit 15 is arranged on the fork 21 which means that the first sensor unit will move in the axial direction together with the fork 21 when the sleeve 9 is moved. The second sensor unit 16 is arranged on the fork holder 21b which is stationary. In another embodiment, the second sensor unit can however be arranged on any suitable stationary part of the transmission, such as for example the housing. This means that the first sensor unit 15 is fixed relative to the sleeve 9 with respect to the axial position, and the second sensor unit 16 is fixed relative to the dog ring 11 with respect to the axial position.

As schematically illustrated in FIG. 1, for performing the method as described herein, a control unit 30 for controlling the shifting mechanism 20 is provided. The control unit 30 is configured to receive input data 31, 32 indicating a relative angular position of a first rotating member 2 and a second rotating member 4 while at least one of the first rotating member and the second rotating member is rotating. For this purpose, the control unit 30 can continuously receive signals 31, 32 from the first sensor unit 15 and the second sensor unit 16. The control unit 30 is further configured to provide output data 33 based on the received input data 31, 32 for controlling the shifting mechanism 20 for connecting the first rotating member 2 and the second rotating member 4 to each other while at least one of the first rotating member 2 and the second rotating member 4 is rotating. The control unit 30 can be electrically connected to the shifting mechanism 20 for transferring signals between the control unit 30 and the drive unit 22 of the shifting mechanism 20.

The control unit 30 may comprise one or more microprocessors and/or one or more memory devices or any other components for executing computer programs to perform the method.

Thus, the control unit is preferably provided with a computer program for performing all steps of any embodiment of the method described herein. Furthermore, the control unit can be part of a controller used also for other functions of the shifting mechanism or any other function of the transmission or be provided as a separate unit connectable to a controller.

The method for shifting gears in a transmission 1 comprises the steps of measuring a relative angular position of the first rotating member 2 and the second rotating member 4 while at least one of the first rotating member and the second rotating member is rotating, and controlling the shifting mechanism 20 based on the measured relative angular position for connecting the first rotating member 2 and the second rotating member 4 to each other while at least one of the first rotating member and the second rotating member is rotating. For the example embodiment of the transmission in FIG. 1, the method comprises the step of measuring the relative angular position between the first rotating member teeth 6 and the second rotating member teeth 7. The measurement of the relative angular position is suitably performed continuously at a frequency adapted to the current rotational speeds of the first rotating member 2 and the second rotating member 4.

The method preferably comprises the step of controlling the shifting mechanism 20 based on a relative rotational speed of the first rotating member 2 and the second rotating member 4. Thus, in addition to the relative angular position of the first rotating member 2 and the second rotating member 4, the relative rotational speed can be used as input to the control unit 30. Further, the method can also comprise the step of controlling the shifting mechanism 20 based on a relative axial position of the first rotating member 2 and the second rotating member 4. In FIG. 1, in addition to the signals 31, 32 indicating the relative angular position transferred from the first sensor unit 15 and the second sensor unit 16 to the control unit 30, the relative rotational speed 34 and the relative axial position 35 are schematically indicated as input to the control unit 30. It should however be stressed that the relative rotational speed and the relative axial position can be measured by the sensor arrangement arranged for measuring the relative angular position or by any other sensor, or alternatively be already known, for example by other measurements, dimensions and/or calculations. Further, any other input useful for the gear shifting algorithm can of course be transferred to the control unit.

Both when the first rotating member 2 and the second rotating member 4 rotate with a small difference in rotational speed or at substantially the same rotational speed, for example after synchronization, or when the first rotating member and the second rotating member rotate with a substantial difference in rotational speed, which can be the case for a non-synchronized transmission, the movement of the shifting mechanism 20 is suitably adapted such that the first rotating member teeth 6 and the second rotating member teeth 7 can be engaged while tooth tip-to-tooth tip contact being avoided.

The method can comprise the step of controlling the starting point, speed and/or acceleration of the shifting mechanism 20 based on the measured relative angular position of the first rotating member 2 and the second rotating member 4.

Figure 3:
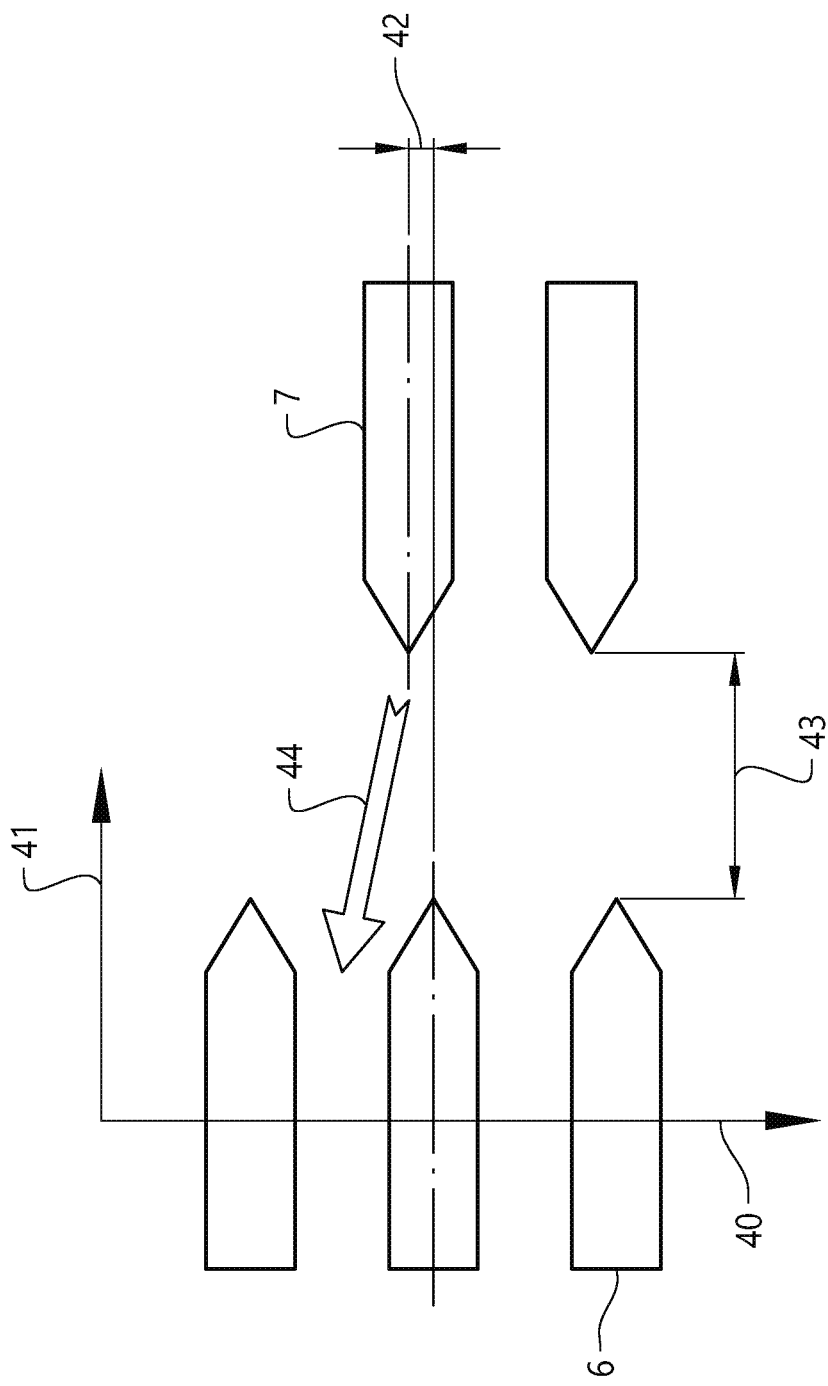
FIG. 3 is a schematic view of teeth of a first rotating member and teeth of a second rotating member to be matched at gear shifting.

FIG. 3 is a schematic illustration showing some teeth 6 of the first rotating member 2 and some teeth 7 of the second rotating member 4. The first rotating member 2 is rotating with a speed n1 and the second rotating member 4 is rotating in the same rotation direction with a speed n2. If the speed n1 is higher than the speed n2, there is a relative tangential speed between the first rotating member 2 and the second rotating member 4. When shifting is performed, the shifting mechanism 20 is activated and a relative axial movement of the first rotating member 2 and the second rotating member 4 is used for engagement of the teeth 6, 7. A relative axial speed 41 between the first rotating member 2 and the second rotating member 4 during the axial movement is adapted to the relative angular position 42, the relative tangential speed 40 and to an axial distance 43 between the first rotating member 2 and the second rotating member 4. The resulting relative movement of the first rotating member 2 and second rotating member 4 can be controlled to match the first rotating member teeth 6 into the gaps of the second rotating member and the second rotating member teeth 7 into the gaps of the first rotating member. The resulting movement is schematically indicated by an arrow 44. It should be stressed that FIG. 3 is a schematic plane view seen in a radial direction of the first rotating member and the second rotating member used for illustration purpose only. However, the real relative angular position is of course a difference between the angular position of the first rotating member and the angular position of the second rotating member which difference is suitably represented by an angle.

It is to be understood that the present invention is not limited to the embodiments described above and illustrated in the drawings; rather, the skilled person will recognize that many changes and modifications may be made within the scope of the appended claims.

The invention claimed is:

1. A transmission for a vehicle, the transmission comprising a first rotating member for rotation about an axis and a second rotating member for rotation about the axis, the first rotating member and the second rotating member being connectable to each other such that the first rotating member and the second rotating member are rotationally locked relative to each other for transferring torque between the first rotating member and the second rotating member, wherein the transmission comprises a sensor arrangement for measuring a relative angular position of the first rotating member and the second rotating member while at least one of the first rotating member and the second rotating member is rotating, and wherein the transmission has a shifting mechanism for displacement of the first rotating member and the second rotating member relative to each other, and at least a part of the sensor arrangement is arranged on the shifting mechanism.

2. The transmission according to claim 1, wherein the first rotating member has a set of teeth and the second rotating member has a set of teeth, the first rotating member teeth and the second rotating member teeth being arranged for engagement with each other for connection of the first rotating member and the second rotating member to each other, and the sensor arrangement is arranged for measuring the relative angular position between the first rotating member teeth and the second rotating member teeth.

3. The transmission according to claim 2, wherein the sensor arrangement is arranged for sensing a tooth at a predetermined measuring position.

4. The transmission according to claim 2, wherein the sensor arrangement is arranged for sensing a gap between two adjacent teeth at a predetermined measuring position.

5. The transmission according to claim 1, wherein the sensor arrangement comprises a first sensor unit for measuring an angular position of the first rotating member and a second sensor unit for measuring an angular position of the second rotating member.

6. The transmission according to claim 5, wherein the first sensor unit is arranged for measuring the angular position of the first rotating member at a first predetermined measuring position and the second sensor unit is arranged for measuring the angular position of the second rotating member at a second predetermined measuring position, the first predetermined measuring position and the second predetermined measuring position being arranged at the same angular position or with a predetermined angular distance relative to each other with respect to the rotation axis.

7. The transmission according to claim 1, wherein the transmission comprises a synchronizer for synchronizing the rotational speeds of the first rotating member and the second rotating member before connection of the first rotating member and the second rotating member to each other.

8. The transmission according to claim 1, wherein the transmission is a non-synchronous transmission.

9. A transmission for a vehicle, the transmission comprising a first rotating member for rotation about an axis and a second rotating member for rotation about the axis, the first rotating member and the second rotating member being connectable to each other such that the first rotating member and the second rotating member are rotationally locked relative to each other for transferring torque between the first rotating member and the second rotating member, wherein the transmission comprises a sensor arrangement for measuring a relative angular position of the first rotating member and the second rotating member while at least one of the first rotating member and the second rotating member is rotating, and wherein the transmission comprises a shaft and a hub rotationally locked relative to the shaft, and the first rotating member is an axially displaceable sleeve arranged on the hub and the second rotating member is an idle gear wheel which is journaled on the shaft.

10. A method for shifting gears in a transmission comprising a first rotating member for rotation about an axis and a second rotating member for rotation about the axis, and a shifting mechanism, the first rotating member and the second rotating member being connectable to each other such that the first rotating member and the second rotating member are rotationally locked relative to each other for transferring torque between the first rotating member and the second rotating member, wherein the method includes measuring a relative angular position of the first rotating member and the second rotating member while at least one of the first rotating member and the second rotating member is rotating, and controlling a speed of the shifting mechanism based on the measured relative angular position for connecting the first rotating member and the second rotating member to each other while at least one of the first rotating member and the second rotating member is rotating.

11. The method according to claim 10, further including controlling the shifting mechanism based on a relative rotational speed of the first rotating member and the second rotating member.

12. The method according to claim 10, further including controlling the shifting mechanism based on a relative axial position of the first rotating member and the second rotating member.

13. The method according to claim 10, wherein the first rotating member has a set of teeth and the second rotating member has a set of teeth, the first rotating member teeth and the second rotating member teeth being arranged for engagement with each other for connection of the first rotating member and the second rotating member to each other, the method further including measuring the relative angular position between the first rotating member teeth and the second rotating member teeth.

14. The method according to claim 13, further including measuring the relative angular position by sensing a tooth at a predetermined measuring position.

15. The method according to claim 13, further including measuring the relative angular position by sensing a gap between two adjacent teeth at a predetermined measuring position.

16. The method according to claim 10, further including controlling a starting point and/or acceleration of the shifting mechanism based on the measured relative angular position of the first rotating member and the second rotating member.

17. A control unit for controlling a transmission, wherein the control unit is configured to receive input data indicating a relative angular position of a first rotating member and a second rotating member while at least one of the first rotating member and the second rotating member is rotating, and to provide output data based on the received input data for controlling a speed of a shifting mechanism for connecting the first rotating member and the second rotating member to each other while at least one of the first rotating member and the second rotating member is rotating.

* * * * *